United States Patent
Kim

(10) Patent No.: US 12,401,074 B2
(45) Date of Patent: Aug. 26, 2025

(54) BATTERY THERMAL MANAGEMENT SYSTEM FOR VEHICLE

(71) Applicants: Hyundai Motor Company, Seoul (KR); Kia Corporation, Seoul (KR)

(72) Inventor: Yong Jae Kim, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 503 days.

(21) Appl. No.: 18/145,263

(22) Filed: Dec. 22, 2022

(65) Prior Publication Data

US 2023/0378564 A1 Nov. 23, 2023

(30) Foreign Application Priority Data

May 18, 2022 (KR) .................. 10-2022-0060703

(51) Int. Cl.
| | |
|---|---|
| *H01M 10/63* | (2014.01) |
| *H01M 10/613* | (2014.01) |
| *H01M 10/6568* | (2014.01) |
| *B60L 58/26* | (2019.01) |

(52) U.S. Cl.
CPC ......... *H01M 10/63* (2015.04); *H01M 10/613* (2015.04); *H01M 10/6568* (2015.04); *B60L 58/26* (2019.02); *H01M 2220/20* (2013.01)

(58) Field of Classification Search
CPC ............ H01M 10/63; H01M 10/613; H01M 10/6568; H01M 2220/20; H01M 10/486; H01M 10/617; H01M 10/625; H01M 10/633; H01M 10/66; H01M 50/213; H01M 50/249; B60L 58/26; B60L 1/003; B60L 1/02; B60L 2240/545; B60L 58/21; Y02E 60/10; B60Y 2200/91
See application file for complete search history.

(56) References Cited

U.S. PATENT DOCUMENTS

| | | | | |
|---|---|---|---|---|
| 2015/0121939 | A1* | 5/2015 | Takeuchi | F25B 13/00 62/324.6 |
| 2019/0363411 | A1* | 11/2019 | Takeuchi | H01M 10/6552 |

FOREIGN PATENT DOCUMENTS

| | | | | |
|---|---|---|---|---|
| CN | 109599613 A | * | 4/2019 | .......... H01M 10/613 |
| CN | 210245678 U | * | 4/2020 | ............. Y02E 60/10 |
| CN | 112046237 A | * | 12/2020 | ............... B60K 1/00 |
| CN | 212242889 U | * | 12/2020 | ............. Y02E 60/10 |
| CN | 109599634 B | * | 1/2021 | ........ H01M 10/6568 |

(Continued)

*Primary Examiner* — Kaity V Chandler
(74) *Attorney, Agent, or Firm* — Slater Matsil, LLP

(57) ABSTRACT

An embodiment battery thermal management system includes a first cooling circuit including a battery including battery cells, a second cooling circuit including a water pump for supplying and circulating coolant to the first cooling circuit, a coolant flow control valve connecting the first and second cooling circuits such that the coolant flows therethrough, the coolant flow control valve configured to control a flow direction of the coolant supplied to the first cooling circuit to be a first or second direction, and a controller configured to determine the flow direction of the coolant passing through the coolant flow control valve and to control an operation mode of the coolant flow control valve based on a temperature difference between a first battery cell disposed closest to a first coolant passage of the battery and a second battery cell disposed closest to a second coolant passage of the battery.

20 Claims, 10 Drawing Sheets

(56) References Cited

FOREIGN PATENT DOCUMENTS

| GB | 2539039 A * | 12/2016 | .......... H01M 10/613 |
| JP | 7173064 B2 * | 11/2022 | .......... B60H 1/00278 |
| WO | WO-2017110250 A1 * | 6/2017 | .......... H01M 10/615 |

* cited by examiner

BATTERY THERMAL MANAGEMENT SYSTEM FOR VEHICLE

CROSS-REFERENCE TO RELATED APPLICATIONS

This application claims the benefit of Korean Patent Application No. 10-2022-0060703, filed on May 18, 2022, which application is hereby incorporated herein by reference.

TECHNICAL FIELD

The present disclosure relates to a battery thermal management system for a vehicle.

BACKGROUND

In general, vehicles using an electric motor as a drive source are equipped with a battery capable of being charged and discharged as a power source, and a battery thermal management system is applied to efficiently manage the performance of the battery.

The battery thermal management system allows the performance and efficiency of the battery to be maintained through temperature management of the battery and typically manages a temperature of the battery using coolant.

A conventional battery thermal management system manages and controls the temperature of the battery while circulating the coolant in one direction. At this time, battery cells configuring the battery are cooled while the coolant sequentially passes through the battery cells.

However, when an electric motor is driven under a high load condition, a temperature of the coolant for cooling the battery rises rapidly because the battery overheats, and thus a temperature difference between battery cells disposed upstream and battery cells disposed downstream increases. This is because the battery cell disposed downstream is cooled by the coolant heated while cooling the battery cell disposed upstream.

When the temperature difference between the battery cells increases, an output of the battery is limited, resulting in decreasing a travelable time of a vehicle.

The above information disclosed in this background section is only for enhancement of understanding of the background of embodiments of the disclosure and accordingly it may include information that does not form the prior art that is already known to a person of ordinary skill in the art.

SUMMARY

The present disclosure relates to a battery thermal management system for a vehicle. Particular embodiments relate to a battery thermal management system for a vehicle for securing battery cooling performance by reducing a temperature difference between battery cells.

Embodiments of the present disclosure can solve problems in the art, and an embodiment of the present disclosure provides a battery thermal management system for a vehicle, which improves battery cooling performance by reducing a temperature difference between battery cells.

The embodiments of the present disclosure are not limited to the above-described embodiment, and other embodiments of the present disclosure not mentioned will be able to be clearly understood by those skilled in the art to which the present disclosure pertains from the following description.

A battery thermal management system for a vehicle according to an embodiment of the present disclosure includes a first cooling circuit including a battery including a plurality of battery cells, a second cooling circuit including a water pump configured to supply and circulate coolant for cooling the battery to the first cooling circuit, a coolant flow control valve connecting the first cooling circuit and the second cooling circuit so that the coolant flows therethrough and configured to control a flow direction of the coolant supplied to the first cooling circuit to become any one of a first direction and a second direction, and a controller configured to determine a flow direction of the coolant passing through the coolant flow control valve and control an operation mode of the coolant flow control valve based on a temperature difference between a first battery cell disposed closest to a first coolant passage of the battery and a second battery cell disposed closest to a second coolant passage of the battery among the plurality of battery cells.

According to an embodiment of the present disclosure, the controller changes the flow direction of the coolant from the first direction to the second direction by changing the operation mode of the coolant flow control valve when a value (T2−T1=ΔT) obtained by subtracting a temperature T1 of the first battery cell from a temperature T2 of the second battery cell is greater than or equal to a predetermined first threshold ΔT_thr.

In addition, the controller changes the flow direction of the coolant from the second direction to the first direction by changing the operation mode of the coolant flow control valve when the value (T2−T1=ΔT) obtained by subtracting the temperature T1 of the first battery cell from the temperature T2 of the second battery cell is smaller than or equal to a predetermined second threshold −ΔT_thr.

In addition, the controller maintains a real-time flow direction as the flow direction of the coolant by maintaining a real-time operation mode as the operation mode of the coolant flow control valve when the value (T2−T1=ΔT) obtained by subtracting the temperature T1 of the first battery cell from the temperature T2 of the second battery cell is greater than the second threshold −ΔT_thr and smaller than the first threshold ΔT_thr.

In addition, when the flow direction of the coolant is controlled in the first direction by the coolant flow control valve, the coolant is introduced into the battery through the first coolant passage and discharged from the battery through the second coolant passage.

In addition, when the flow direction of the coolant is controlled in the second direction by the coolant flow control valve, the coolant is introduced into the battery through the second coolant passage of the battery and discharged from the battery through the first coolant passage of the battery.

In addition, according to another embodiment of the present disclosure, the controller changes the operation mode of the coolant flow control valve in a state of reducing a speed of the water pump to a predetermined minimum speed.

According to still another embodiment of the present disclosure, the controller changes the operation mode of the coolant flow control valve in a state of stopping a driving of the water pump.

According to embodiments of the present disclosure according to the above configuration, it is possible to reduce the temperature difference between the battery cells and improve the battery cooling performance by changing the flow direction of the coolant according to the temperature difference between the battery cells.

The effects of embodiments of the present disclosure are not limited to the above-described effects, and other effects of embodiments of the present disclosure not mentioned will be able to be understood by those skilled in the art to which the present disclosure pertains from the following description.

It is understood that the term "automotive" or "vehicular" or other similar term as used herein is inclusive of motor vehicles in general such as passenger automobiles including sport utility vehicles (SUVs), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid automotive is an automotive that has two or more sources of power, for example both gasoline-powered and electric-powered vehicles.

The above and other features of embodiments of the disclosure are discussed infra.

BRIEF DESCRIPTION OF THE DRAWINGS

The above and other features of embodiments of the present disclosure will now be described in detail with reference to certain exemplary examples thereof illustrated in the accompanying drawings which are given herein below by way of illustration only, and thus are not limitative of the present disclosure, and wherein.

Figure 1:
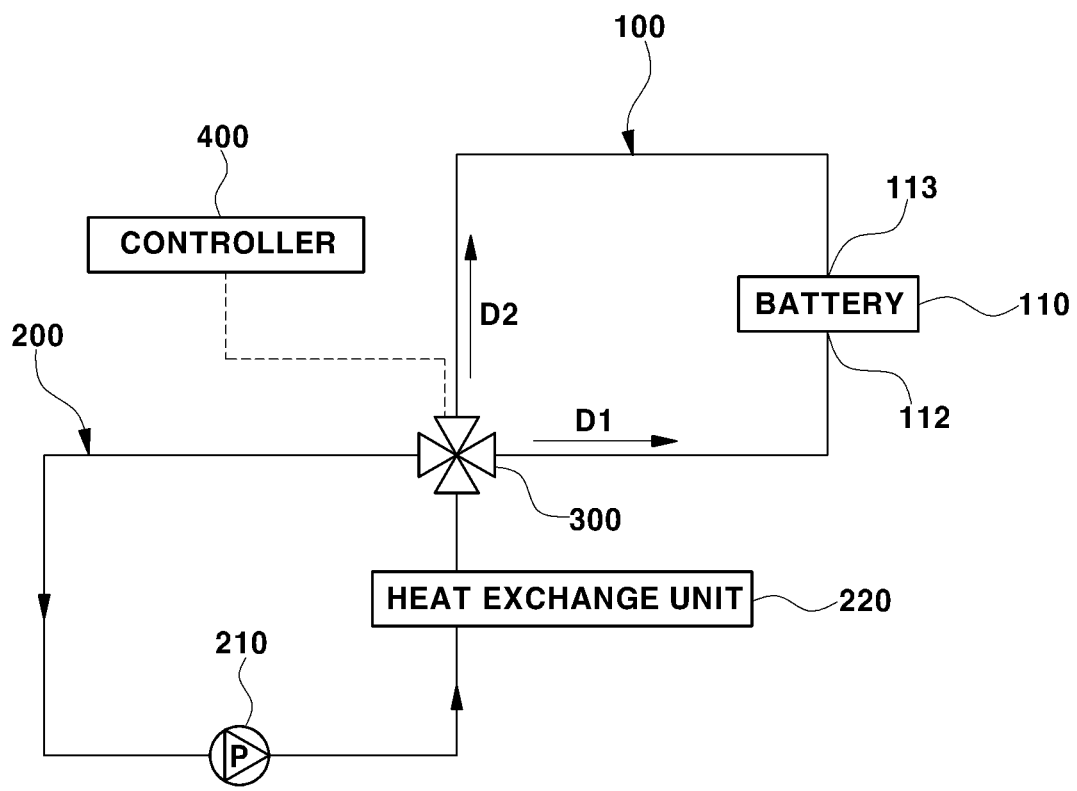
FIG. 1 is a view showing a battery thermal management system for a vehicle according to an embodiment of the present disclosure.

It should be understood that the appended drawings are not necessarily to scale, presenting a somewhat simplified representation of various preferred features illustrative of the basic principles of embodiments of the disclosure. The specific design features of embodiments of the present disclosure as disclosed herein, including, for example, specific dimensions, orientations, locations, and shapes will be determined in part by the particular intended application and use environment.

In the figures, reference numbers refer to the same or equivalent sections of the present disclosure throughout the several figures of the drawings.

DETAILED DESCRIPTION OF ILLUSTRATIVE EMBODIMENTS

Specific structural or functional descriptions presented in the embodiments of the present disclosure are only exemplified for the purpose of describing the embodiments according to the concept of the present disclosure, and the embodiments according to the concept of the present disclosure may be carried out in various forms.

In addition, throughout this specification, when a certain portion "comprises" a certain component, it means that other components may be further included rather than excluding other components unless otherwise stated.

Meanwhile, in embodiments of the present disclosure, terms such as "first" and/or "second" may be used to describe various components, but the components are not limited by the terms. The terms are used only for the purpose of distinguishing one component from other components. For example, a first component may be named as a second component, and similarly, the second component may be named as the first component without departing from the scope according to the concept of the present disclosure.

Hereinafter, embodiments of the present disclosure will be described with reference to the accompanying drawings. The matters expressed in the accompanying drawings may be different from forms actually implemented in the drawings shown to easily describe the embodiments of the present disclosure.

Embodiments of the present disclosure relate to a battery thermal management system for a vehicle that manages and controls a temperature of a battery using coolant, and according to embodiments of the present disclosure, it is possible to reduce a temperature difference between battery cells and secure battery cooling performance by monitoring temperatures of battery cells in real time while traveling, and controlling a flow direction of coolant flowing through a battery to be changed based on the monitoring result.

As shown in FIG. 1, the battery thermal management system for a vehicle according to an embodiment of the present disclosure is configured to include a first cooling circuit 100 including a battery 110, a second cooling circuit 200 including a water pump 210 and a heat exchange unit 220, a coolant flow control valve 300 connecting the first cooling circuit 100 and the second cooling circuit 200 to enable the flow of coolant, and a controller 400 configured to determine and control an operation of the coolant flow control valve 300.

Figure 2:
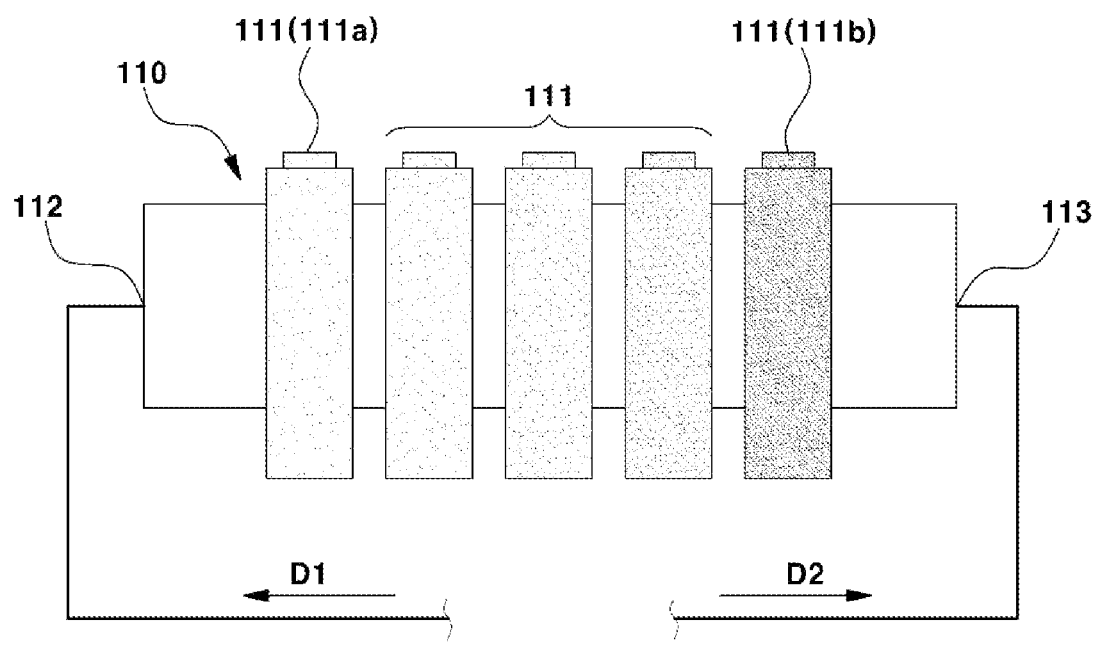
FIG. 2 is a view for describing a principle of cooling a battery cell according to a flow direction of coolant of the battery thermal management system according to an embodiment of the present disclosure.

As shown in FIG. 2, the battery 110 is configured to include a plurality of battery cells in, and is provided with a pair of coolant passages 112 and 113 for inflow and discharge of coolant. The battery 110 may mean a battery pack unless otherwise stated. The battery pack may include a plurality of battery modules.

The battery 110 includes a first coolant passage 112 and a second coolant passage 113 at both ends with respect to a flow direction of the coolant circulated in the first cooling circuit 100. In the battery 110, the coolant is introduced through any one of the first coolant passage 112 and the second coolant passage 113, and the coolant is discharged through the other in the flow direction of the coolant circulated in the first cooling circuit 100.

In other words, in the battery 110, the coolant is introduced through a coolant passage positioned upstream among the first coolant passage 112 and the second coolant passage 113 and the coolant is discharged through a coolant passage positioned downstream with respect to the flow direction of the coolant circulated in the first cooling circuit 100.

For example, when the coolant is introduced into the battery 110 through the first coolant passage 112 and is discharged from the battery 110 through the second coolant passage 113, the flow direction of the coolant may be referred to as a first direction D1. In addition, when the coolant is introduced into the battery 110 through the second coolant passage 113 and is discharged from the battery 110 through the first coolant passage 112, the flow direction of the coolant may be referred to as a second direction D2. The first direction D1 and the second direction D2 are different from each other. Specifically, the first direction D1 and the second direction D2 are opposite to each other.

The water pump 210 is an electric pump configured to forcibly supply coolant for cooling the battery 110 to the first cooling circuit 100 and is controlled to be driven by the controller 400 to pressure-feed the coolant to the first cooling circuit wo and circulate the coolant.

The heat exchange unit 220 performs heat exchange with the coolant circulated in the second cooling circuit 200 and cools or heats the coolant through the heat exchange.

The coolant flow control valve 300 is disposed between the first cooling circuit 100 and the second cooling circuit 200 and is configured to control the flow of coolant between the first cooling circuit 100 and the second cooling circuit 200.

In other words, the coolant flow control valve 300 controls the flow of the coolant that flows from the first cooling circuit 100 to the second cooling circuit 200 and the flow of the coolant that flows from the second cooling circuit 200 to the first cooling circuit 100. The coolant flow control valve 300 may be configured as a four-way valve.

The coolant flow control valve 300 is configured to control the flow direction of the coolant that flows from the second cooling circuit 200 to the first cooling circuit 100 to become any one of the first direction D1 and the second direction D2.

Figure 3:
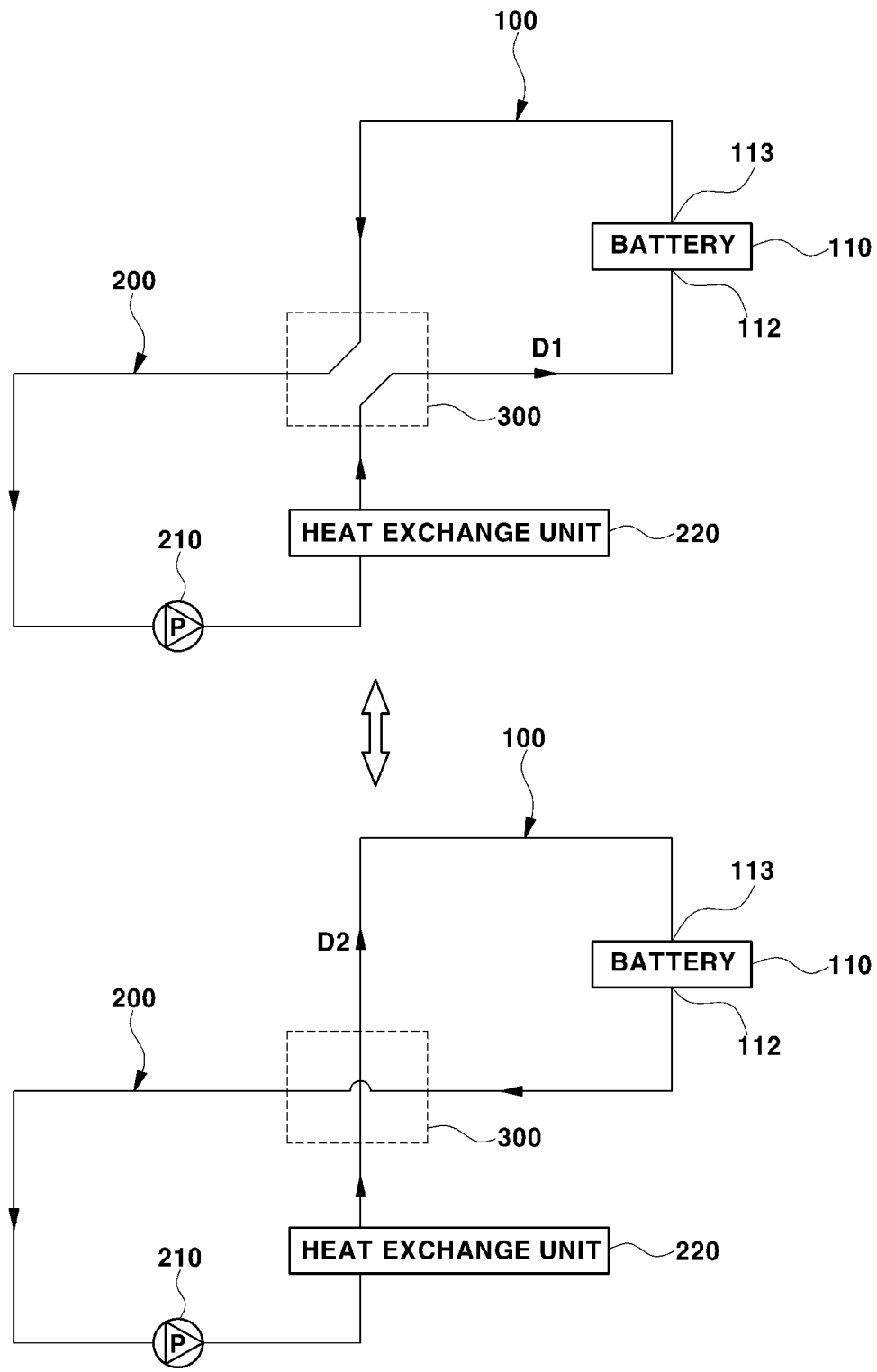
FIG. 3 is a view showing the flow direction of the coolant controlled through the battery thermal management system according to an embodiment of the present disclosure.

The circulation direction of the coolant circulated in the first cooling circuit wo is determined according to the flow direction of the coolant passing through the coolant flow control valve 300. In other words, as shown in FIG. 3, the circulation direction of the coolant circulated in the first cooling circuit 100 may be controlled to become any one of the first direction D1 and the second direction D2 according to an operation mode of the coolant flow control valve 300.

When the coolant flow control valve 300 is operated in a first operation mode, the flow of the coolant in the first direction D1 occurs in the first cooling circuit 100. In addition, when the coolant flow control valve 300 is operated in a second operation mode, the flow of the coolant in the second direction D2 occurs in the first cooling circuit 100.

Here, the first operation mode may be a forward operation mode, and the second operation mode may be a reverse operation mode. The first operation mode may be determined as an initial operation mode of the coolant flow control valve 300 when a vehicle starts to travel. In other words, the coolant flow control valve 300 may be operated in the first operation mode at an initial stage when a vehicle starts to travel. In addition, when a vehicle starts to travel, an initial flow direction of the coolant supplied to the battery 110 is the first direction D1. For example, the first direction D1 may be determined as a direction that is advantageous for battery cooling performance and the like in design.

Figure 4:
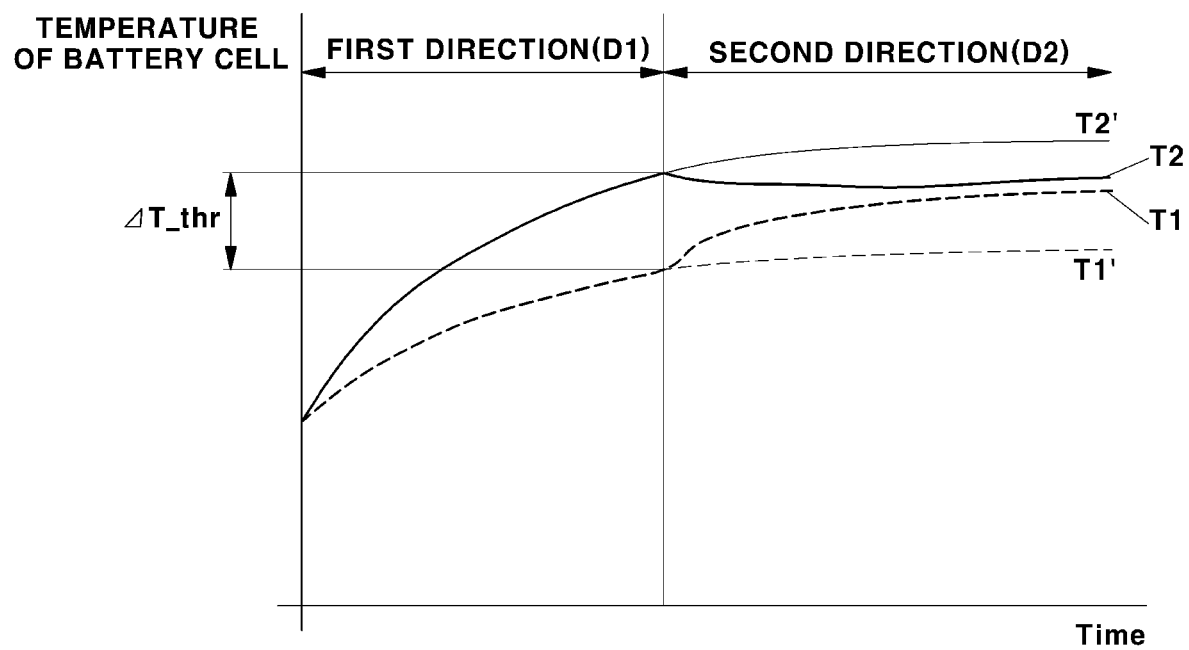
FIG. 4 is a view showing an example of a change in a battery temperature according to the flow direction of the coolant of the battery thermal management system according to an embodiment of the present disclosure.

When the coolant flows in only one direction in the first cooling circuit 100, as shown in FIG. 4, a temperature difference (T2−T1) between the battery cell disposed upstream and the battery cell disposed downstream increases over time.

When the temperature difference (T2−T1) between the battery cells in configuring the battery 110 is greater than or equal to a predetermined threshold $\Delta T\_thr$, the controller 400 reduces the temperature difference (T2−T1) between the battery cells in by changing the flow direction of the coolant circulated in the first cooling circuit 100. When the flow direction of the coolant is not changed when a temperature difference (T2'−T1') between the battery cells 111 is greater than or equal to the threshold, the temperature difference (T2'−T1') gradually increases without decrease as shown in FIG. 4.

In order to reduce the temperature difference (T2−T1) between the battery cells in, two or more temperature sensors 115 and 115' (see FIG. 5) are installed in the battery 110, and the controller 400 calculates the temperature difference between the battery cells in based on temperature information detected through the temperature sensors 115 and 115' installed at predetermined positions of the battery 110.

Specifically, the controller 400 calculates a temperature difference between a first battery cell 111a disposed closest to the first coolant passage 112 and a second battery cell 111b disposed closest to the second coolant passage 113 among the battery cells in, determines the flow direction of the coolant passing through the coolant flow control valve 300 based on the temperature difference between the first battery cell 111a and the second battery cell 111b, and controls the operation of the coolant flow control valve 300.

The flow direction of the coolant passing through the coolant flow control valve 300 is controlled and the circulation direction of the coolant that flows through the first cooling circuit 100 is controlled according to the operation mode of the coolant flow control valve 300.

When a value (T2−T1=$\Delta T$) obtained by subtracting a temperature T1 of the first battery cell 111a from a temperature T2 of the second battery cell nib is greater than or equal to the predetermined first threshold $\Delta T\_thr$, the controller 400 changes the real-time flow direction of the coolant from the first direction D1 to the second direction D2.

In other words, when the real-time flow direction of the coolant is the first direction D1, the flow direction of the coolant is changed to the second direction D2 when a temperature difference $\Delta T$ between the second battery cell 111b and the first battery cell 111a is greater than or equal to the first threshold $\Delta T\_thr$. At this time, the operation mode of the coolant flow control valve 300 is changed from the first operation mode to the second operation mode.

In addition, immediately after the operation mode of the coolant flow control valve 300 is changed from the first operation mode to the second operation mode, the temperature difference $\Delta T$ may still be greater than or equal to the first threshold $\Delta T\_thr$. Accordingly, when the operation mode of the coolant flow control valve 300 is changed from the first operation mode to the second operation mode, the controller 400 monitors the temperature difference $\Delta T$ after a predetermined time elapses.

In addition, when the temperature difference $\Delta T$ between the second battery cell nib and the first battery cell 111a is smaller than or equal to a predetermined second threshold $-\Delta T\_thr$, the controller 400 changes the real-time flow direction of the coolant from the second direction D2 to the first direction D1. At this time, the second threshold $-\Delta T\_thr$ may be determined as a negative (—) value having the same absolute value as the first threshold $\Delta T\_thr$. The first threshold $\Delta T\_thr$ is a positive (+) value.

In other words, when the real-time flow direction of the coolant is the second direction D2, the real-time flow direction of the coolant is changed to the first direction D1 when the temperature difference $\Delta T$ between the second battery cell 111b and the first battery cell 111a is smaller than or equal to the second threshold $-\Delta T\_thr$. At this time, the operation mode of the coolant flow control valve 300 is changed from the second operation mode to the first operation mode.

In addition, immediately after the operation mode of the coolant flow control valve 300 is changed from the second operation mode to the first operation mode, the temperature difference $\Delta T$ may still be smaller than or equal to the second threshold $-\Delta T\_thr$. Accordingly, when the operation mode of the coolant flow control valve 300 is changed from the second operation mode to the first operation mode, the controller 400 monitors the temperature difference $\Delta T$ after a predetermined time elapses.

In addition, the controller 400 maintains the real-time operation mode as the operation mode of the coolant flow control valve 300, when the temperature difference $\Delta T$ is greater than the second threshold $-\Delta T\_thr$ and smaller than the first threshold $\Delta T\_thr$ ($-T\_thr < \Delta T < T\_thr$). At this time, the flow direction of the coolant of the first cooling circuit 100 is maintained without change. In other words, the currently circulated direction, that is, the real-time flow direction, is maintained as the flow direction of the coolant in the first cooling circuit boo.

For example, in the case of "$-T\_thr < \Delta T < T\_thr$" when the operation mode of the coolant flow control valve 300 is the first operation mode, the coolant flow control valve 300 is controlled to be maintained in the first operation mode. In addition, in the case of "$-T\_thr < \Delta T < T\_thr$" when the operation mode of the coolant flow control valve 300 is the second operation mode, the coolant flow control valve 300 is controlled to be maintained in the second operation mode.

When the flow direction of the coolant is controlled in the first direction D1 by the coolant flow control valve 300, the coolant circulated in the first cooling circuit 100 is introduced into the battery 110 through the first coolant passage 112 and discharged from the battery 110 through the second coolant passage 113. In addition, when the flow direction of the coolant is controlled in the second direction D2 by the coolant flow control valve 300, the coolant circulated in the first cooling circuit 100 is introduced into the battery 110 through the second coolant passage 113 and discharged from the battery 110 through the first coolant passage 112.

Meanwhile, when the operation mode of the coolant flow control valve 300 is changed in a state in which a high flow rate of coolant is circulated in the cooling circuits 100 and 200, the flow direction of the coolant may be reversely changed to apply an impact to the cooling circuits 100 and 200. For example, an impact due to a sudden pressure change or the like may be applied to the cooling circuits 100 and 200.

Accordingly, in order to protect the cooling circuits 100 and 200 and the coolant flow control valve 300, the controller 400 changes the operation mode of the coolant flow control valve 300 in a state in which the flow rate of the coolant is reduced.

The controller 400 may temporarily reduce the flow rate of the coolant of the cooling circuits 100 and 200 by stopping a driving of the water pump 210 or minimizing a speed of the water pump 210.

Specifically, the controller 400 changes the operation mode of the coolant flow control valve 300 in a state in which the speed of the water pump 210 is reduced to a predetermined minimum speed. At this time, the controller 400 restores the speed of the water pump 210 to a level before the speed is reduced to the minimum speed when the operation mode of the coolant flow control valve 300 is completely changed. In addition, at this time, the operation mode of the coolant flow control valve 300 may be gradually changed. The minimum speed of the water pump 210 may be set to a value close to '0' and set to a speed value at which the driving of the water pump 210 does not stop.

In addition, the controller 400 may also change the operation mode of the coolant flow control valve 300 in a state of temporarily stopping the operation of the water pump 210. At this time, the controller 400 may re-drive the water pump 210 when the operation mode of the coolant flow control valve 300 is completely changed.

In addition, the controller 400 may change the operation mode of the coolant flow control valve 300 after a predetermined time elapses after the operation of the water pump 210 is stopped. When the driving of the water pump 210 is stopped, a driving of a compressor is also stopped or minimized in order to prevent damage to the compressor in the water pump 210.

Meanwhile, the battery 110 may include a plurality of battery modules 101 configured to have a plurality of battery cells in grouped.

Figure 6:
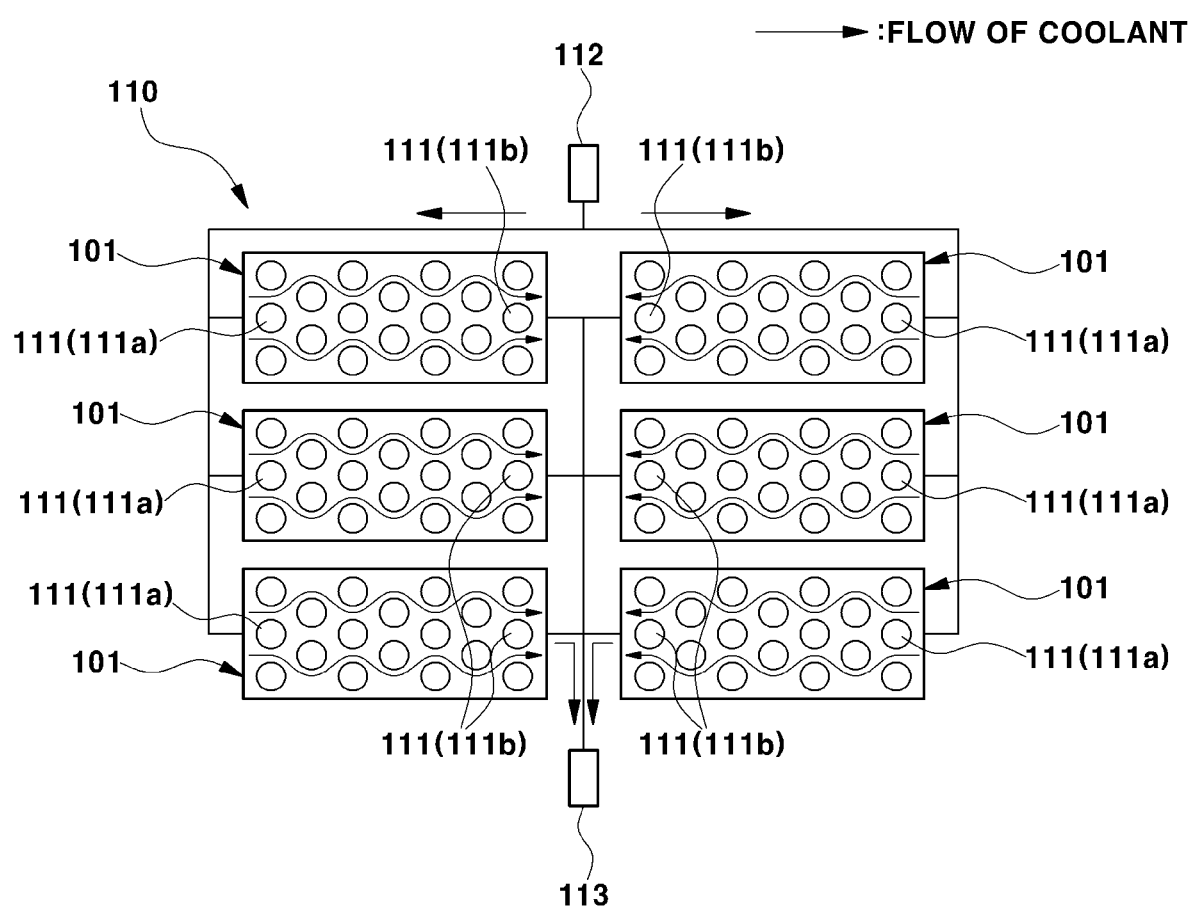
Figure 7:
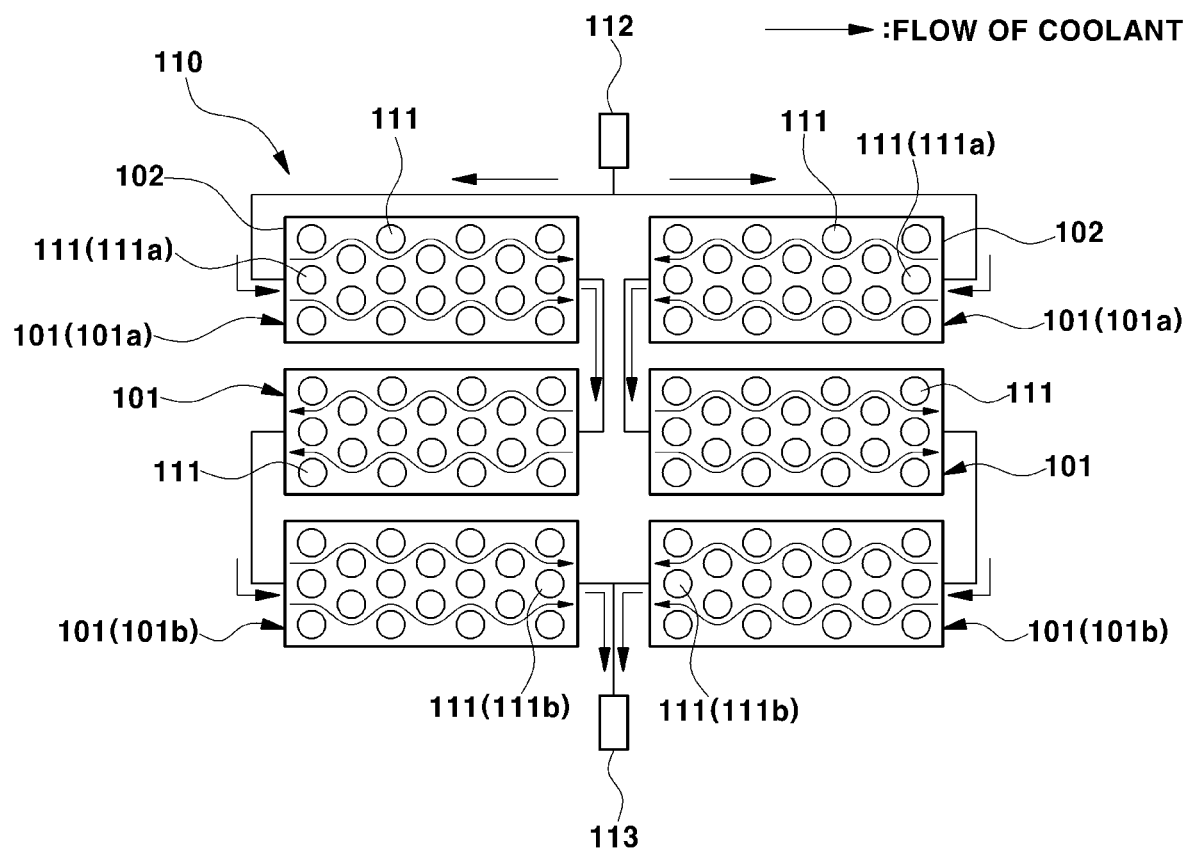

Specifically, the battery 110 may include the plurality of battery modules 101 connected in series with respect to the flow direction of the coolant (see FIG. 5), may include the plurality of battery modules 101 connected in parallel (see FIG. 6), or may include the plurality of battery modules 101 connected in series and in parallel (see FIG. 7).

Figure 5:
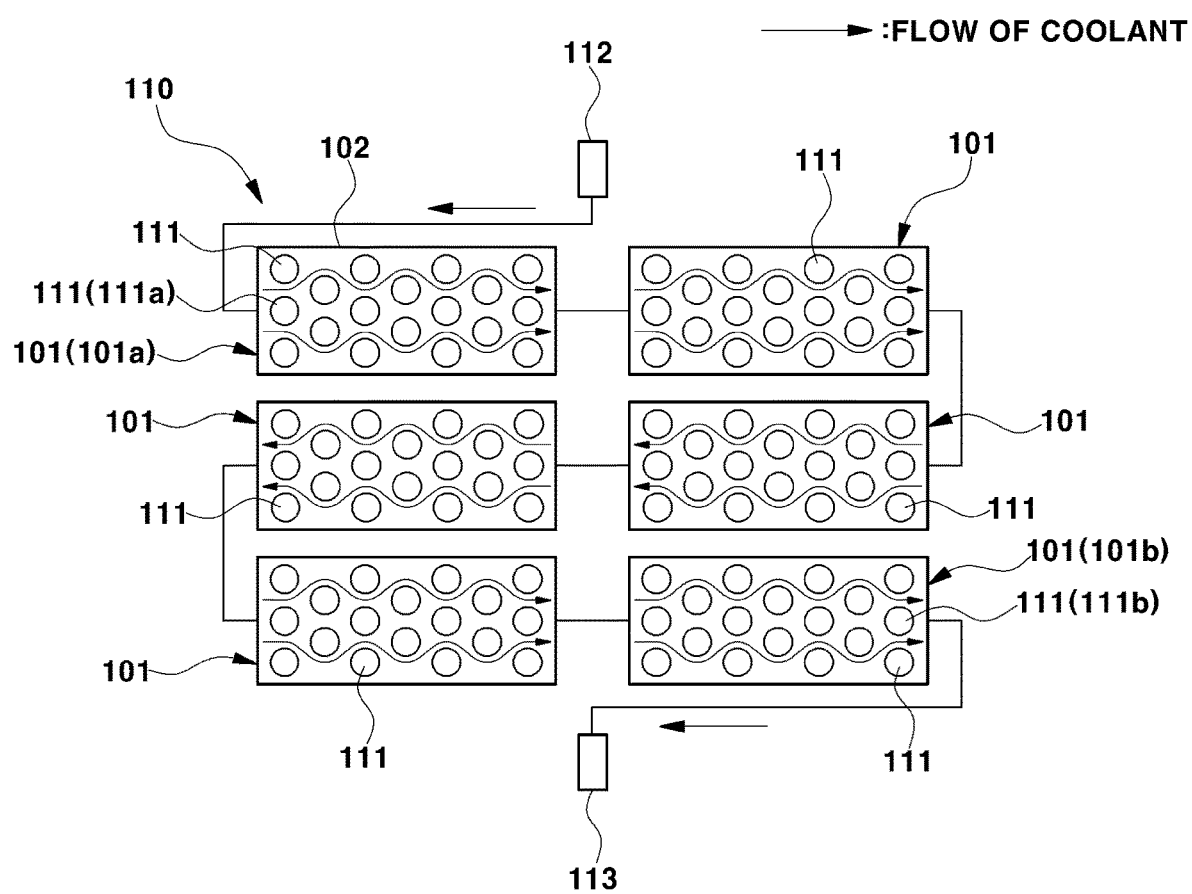
FIGS. 5 to 7 are views showing an example of a connection structure of battery modules according to an embodiment of the present disclosure.

Referring to FIGS. 5 to 7, the battery modules 101 include a module housing 102 having an internal space and the plurality of battery cells in disposed to enable the flow of the coolant in the module housing 102. The coolant introduced into the module housing 102 passes between the battery cells in disposed inside the module housing 102 and is discharged to an outside of the module housing 102. The battery cell in may be formed to have a cylindrical external appearance. At this time, the battery cells 111 may be disposed in the module housing 102 without limitation to an electrical connection. In other words, the battery cells 111 may be electrically connected in series, connected in parallel, or connected in series and in parallel.

As in the embodiment shown in FIG. 5, when the battery 110 includes the plurality of battery modules 101 connected in series with respect to the flow direction of the coolant, that is, when the battery modules 101 are all connected in series with respect to the flow direction of the coolant, any one (i.e., a first battery module) of the battery modules 101 includes the first battery cell 111$a$ disposed closest to the first coolant passage 112, and the other (i.e., a second battery module) includes the second battery cell 111$b$ disposed closest to the second coolant passage 113.

The first battery cell 111$a$ is a cell disposed closest to the first coolant passage 112 among the battery cells in included in the first battery module 101$a$, and the second battery cell 111$b$ is a cell disposed closest to the second coolant passage 113 among the battery cells in included in the second battery module 101$b$. Although not shown in the drawings, the temperature sensors 115 and 115' are installed closest to the first battery cell 111$a$ and the second battery cell 111$b$, respectively, among the battery cells 111 in the battery 110 to measure temperatures thereof.

As described above, when the battery 110 includes only one first battery cell 111$a$ and one second battery cell 111$b$, the controller 400 determines and controls the operation mode of the coolant flow control valve 300 based on the temperature difference $\Delta T$ of the first battery cell 111$a$ and the second battery cell 111$b$.

As in the embodiment shown in FIG. 7, when the battery 110 is configured to include the plurality of battery modules 101 connected in series and in parallel with respect to the flow direction of the coolant, two or more battery modules (i.e., the first battery module) among the plurality of battery modules 101 are connected to the first coolant passage 112 in parallel and disposed closest to the first coolant passage 112, and the other two or more battery modules (i.e., the second battery module) are connected to the second coolant passage 113 in parallel and disposed closest to the second coolant passage 113.

Each of the first battery modules Iola includes one first battery cell 111a disposed closest to the first coolant passage 112, and each of the second battery modules 101b includes one second battery cell nib disposed closest to the second coolant passage 113.

Accordingly, the battery 110 includes two or more first battery cells 111a disposed closest to the first coolant passage 112 and two or more second battery cells nib disposed closest to the second coolant passage 113.

As described above, when the battery 110 is configured to include two or more first battery cells 111a and two or more second battery cells nib, the controller 400 determines and controls the operation mode of the coolant flow control valve 300 based on a difference value (T2_avg−T1_avg) between an average temperature T1_avg of the first battery cells 111a and an average temperature T2_avg of the second battery cells 111b.

In addition, as in the embodiment shown in FIG. 6, when the battery 110 includes the plurality of battery modules 101 connected in parallel with respect to the flow direction of the coolant, that is, when all of the battery modules 101 are connected in parallel with respect to the flow direction of the coolant, all of the battery modules 101 include the first battery cell 111a and the second battery cell 111b. In this case, the temperature sensors 115 and 115' may be mounted at both ends of the battery modules 101, respectively, with respect to the flow direction of the coolant passing through the battery modules 101.

As described above, when the battery 110 is configured to include two or more first battery cells 111a and two or more second battery cells 111b, the controller 400 calculates an average value (i.e., a first average temperature) of temperature values detected through a first temperature sensor 115 and an average value (i.e., a second average temperature) of temperature values detected through a second temperature sensor 115', and determines and controls the operation mode of the coolant flow control valve 300 based on the difference value (T2_avg−T1_avg) between the first average temperature T1_avg and the second average temperature T2_avg. At this time, the first average temperature becomes the average temperature of the first battery cells, and the second average temperature becomes the average temperature of the second battery cells.

Figure 8:
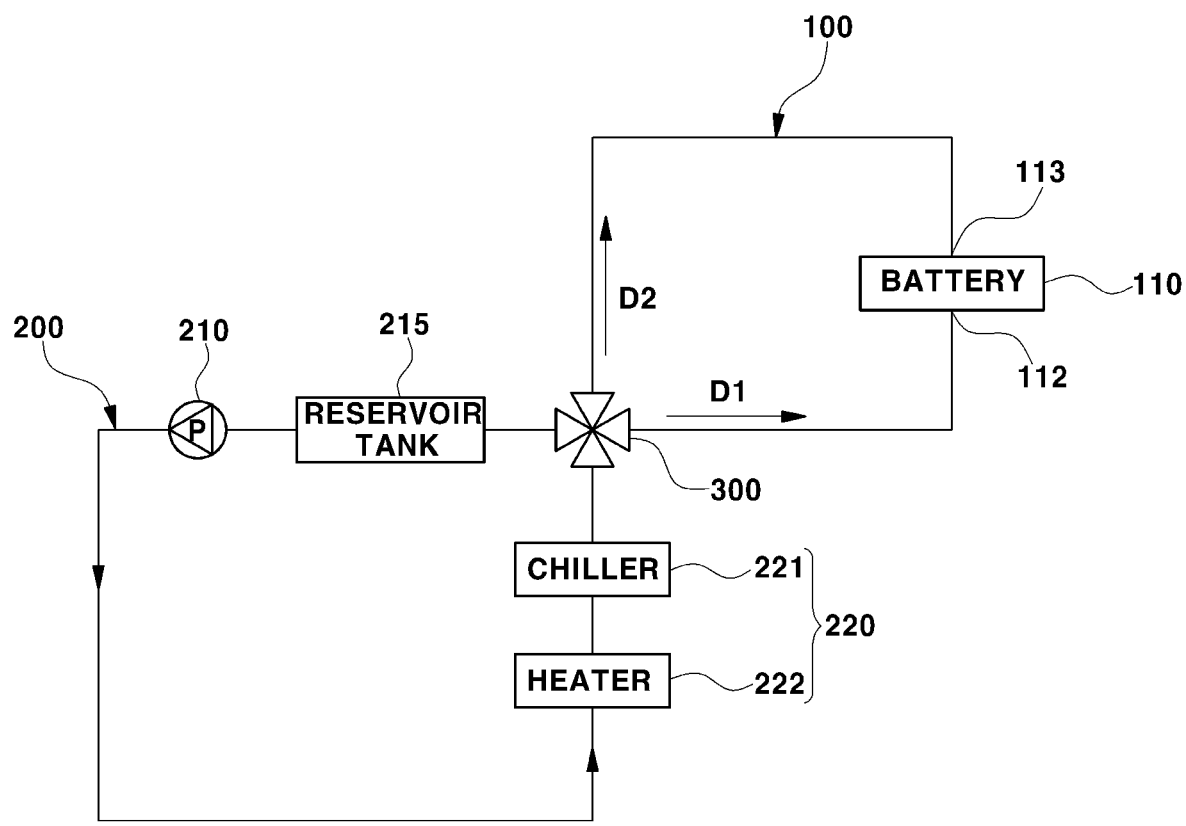
FIGS. 8 to 10 are views showing a detailed structure of a cooling circuit according to an embodiment of the present disclosure.
Figure 9:
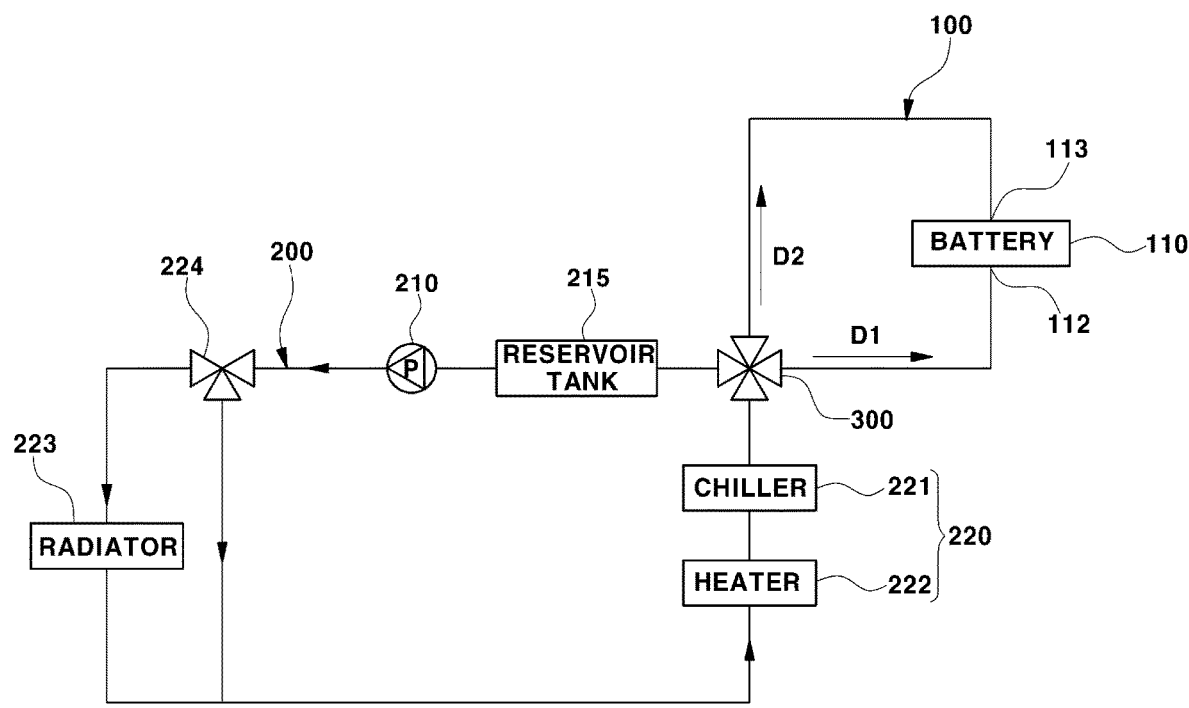
Figure 10:
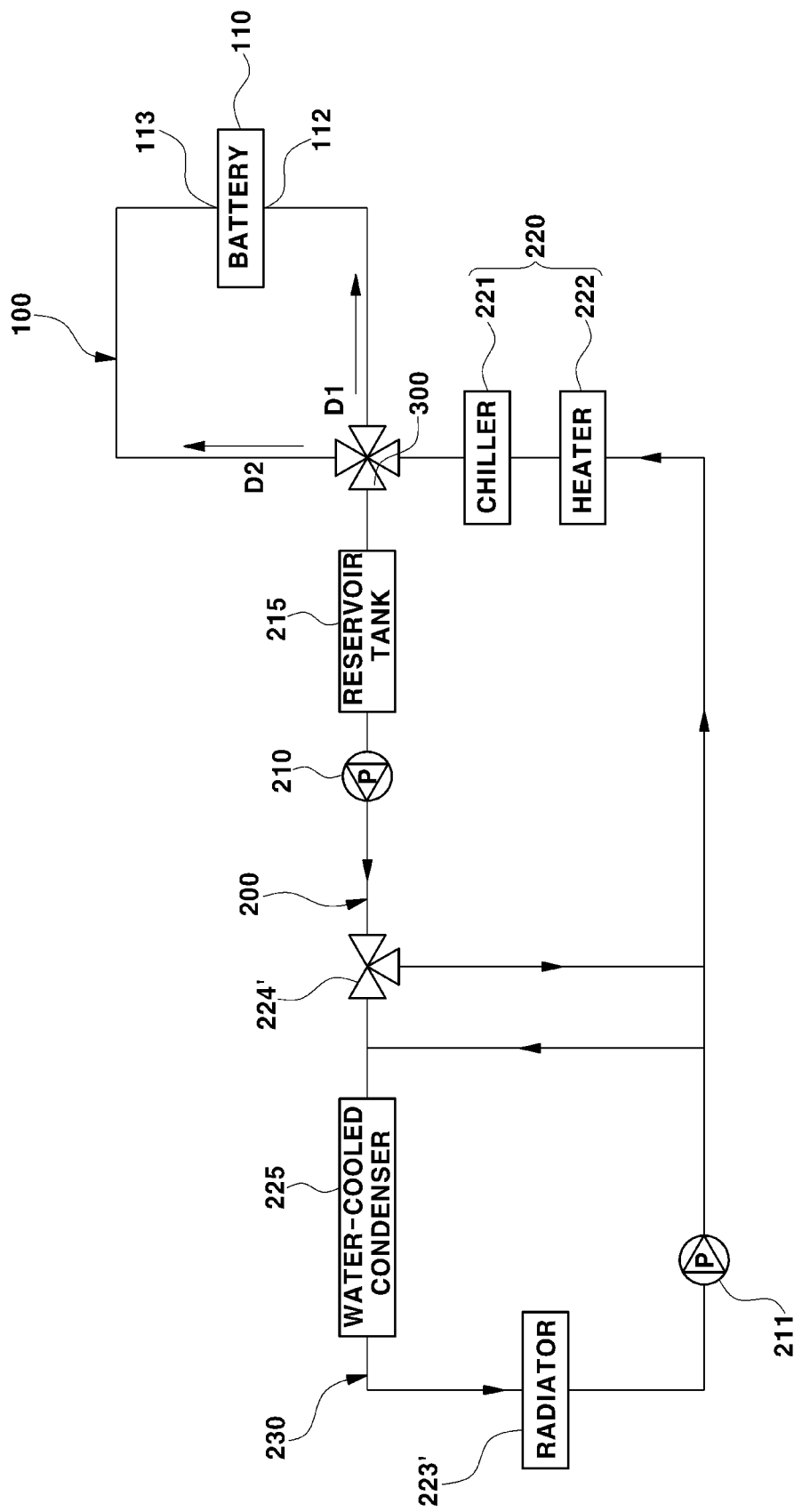

Meanwhile, as shown in FIGS. 8 to 10, the second cooling circuit 200 includes a reservoir tank 215 configured to store coolant and the heat exchange unit 220 in order to control the coolant to have a predetermined temperature. For example, the heat exchange unit 220 may be configured to include a chiller 221 configured to cool the coolant, a heater 222 configured to heat the coolant, and the like.

Referring to FIG. 8, the second cooling circuit 200 may include the chiller 221 and the heater 222. At this time, the chiller 221 and the heater 222 may be disposed to be connected to the water pump 210 in series.

Referring to FIG. 9, the second cooling circuit 200 may include the chiller 221, the heater 222, and a radiator 223. At this time, the chiller 221 and the heater 222 may be disposed to be connected to the water pump 210 in series, and the radiator 223 may be selectively connected to the water pump 210 so that the coolant may flow through a three-way valve 224.

In addition, referring to FIG. 10, the second cooling circuit 200 may include the chiller 221 and the heater 222 and may be connected to a third cooling circuit 230 including a radiator 223', a water-cooled condenser 225, and a separate water pump 211. At this time, the third cooling circuit 230 may be selectively connected to the second cooling circuit 200 through a three-way valve 224'.

The radiators 223 and 223' may cool the coolant through air-cooled heat exchange, and the water-cooled condenser 225 may cool the coolant through water-cooled heat exchange.

Although the embodiments of the present disclosure have been described above in detail, the terms or words used in this specification and claims should not be construed as being limited to general or dictionary meanings, and in addition, the scope of the present disclosure is not limited to the above-described embodiments, and various modifications and improvements by those skilled in the art using the basic concepts of the present disclosure as defined in the appended claims are also included in the scope of the present disclosure.

What is claimed is:

1. A battery thermal management system comprising:
 a first cooling circuit comprising a battery, the battery comprising a plurality of battery cells;
 a second cooling circuit including a water pump configured to supply and circulate coolant to the first cooling circuit for cooling the battery;
 a coolant flow control valve connecting the first cooling circuit and the second cooling circuit such that the coolant flows therethrough, the coolant flow control valve configured to control a flow direction of the coolant supplied to the first cooling circuit to be a first direction or a second direction; and
 a controller configured to determine the flow direction of the coolant passing through the coolant flow control valve and to control an operation mode of the coolant flow control valve based on a temperature difference between a first battery cell disposed closest to a first coolant passage of the battery and a second battery cell disposed closest to a second coolant passage of the battery among the plurality of battery cells.

2. The battery thermal management system of claim 1, wherein the controller is configured to change the flow direction of the coolant from the first direction to the second direction by changing the operation mode of the coolant flow control valve when a value obtained by subtracting a first temperature of the first battery cell from a second temperature of the second battery cell is greater than or equal to a predetermined first threshold.

3. The battery thermal management system of claim 2, wherein the controller is configured to change the flow direction of the coolant from the second direction to the first direction by changing the operation mode of the coolant flow control valve when the value obtained by subtracting the first temperature of the first battery cell from the second temperature of the second battery cell is smaller than or equal to a predetermined second threshold.

4. The battery thermal management system of claim 3, wherein the controller is configured to maintain a real-time flow direction as the flow direction of the coolant by maintaining a real-time operation mode as the operation mode of the coolant flow control valve when the value obtained by subtracting the first temperature of the first battery cell from the second temperature of the second battery cell is greater than the second threshold and smaller than the first threshold.

5. The battery thermal management system of claim 1, wherein when the flow direction of the coolant is controlled in the first direction by the coolant flow control valve, the coolant is introduced into the battery through the first coolant passage and discharged from the battery through the second coolant passage.

6. The battery thermal management system of claim 1, wherein when the flow direction of the coolant is controlled in the second direction by the coolant flow control valve, the coolant is introduced into the battery through the second coolant passage and discharged from the battery through the first coolant passage.

7. The battery thermal management system of claim 1, wherein the controller is configured to change the operation mode of the coolant flow control valve in a state of reducing a speed of the water pump to a predetermined minimum speed.

8. The battery thermal management system of claim 1, wherein the controller is configured to change the operation mode of the coolant flow control valve in a state of stopping a driving of the water pump.

9. The battery thermal management system of claim 1, wherein the battery includes a plurality of battery modules in which the plurality of battery cells are grouped and configured and the plurality of battery modules are connected in series, in parallel, or in series and in parallel with respect to the flow direction of the coolant.

10. The battery thermal management system of claim 9, wherein when two or more first battery modules among the plurality of battery modules include the first battery cell disposed closest to the first coolant passage and when two or more second battery modules among the plurality of battery modules include the second battery cell disposed closest to the second coolant passage, the controller is configured to determine and control the operation mode of the coolant flow control valve based on a difference value between an average temperature of the first battery cells and an average temperature of the second battery cells.

11. The battery thermal management system of claim 1, wherein the second cooling circuit further comprises a heat exchange unit configured to cool or heat the coolant.

12. A vehicle comprising:
an electric motor; and
a battery thermal management system comprising:
a first cooling circuit comprising a battery, the battery comprising a plurality of battery cells;
a second cooling circuit comprising a water pump and a heat exchange unit, the water pump configured to supply and circulate coolant to the first cooling circuit for cooling the battery;
a coolant flow control valve connecting the first cooling circuit and the second cooling circuit such that the coolant flows therethrough, the coolant flow control valve configured to control a flow direction of the coolant supplied to the first cooling circuit to be a first direction or a second direction; and
a controller configured to determine the flow direction of the coolant passing through the coolant flow control valve and to control an operation mode of the coolant flow control valve based on a temperature difference between a first battery cell disposed closest to a first coolant passage of the battery and a second battery cell disposed closest to a second coolant passage of the battery among the plurality of battery cells.

13. The vehicle of claim 12, wherein the controller is configured to change the flow direction of the coolant from the first direction to the second direction by changing the operation mode of the coolant flow control valve when a value obtained by subtracting a first temperature of the first battery cell from a second temperature of the second battery cell is greater than or equal to a predetermined first threshold.

14. The vehicle of claim 13, wherein the controller is configured to change the flow direction of the coolant from the second direction to the first direction by changing the operation mode of the coolant flow control valve when the value obtained by subtracting the first temperature of the first battery cell from the second temperature of the second battery cell is smaller than or equal to a predetermined second threshold.

15. The vehicle of claim 14, wherein the controller is configured to maintain a real-time flow direction as the flow direction of the coolant by maintaining a real-time operation mode as the operation mode of the coolant flow control valve when the value obtained by subtracting the first temperature of the first battery cell from the second temperature of the second battery cell is greater than the second threshold and smaller than the first threshold.

16. The vehicle of claim 12, wherein when the flow direction of the coolant is controlled in the first direction by the coolant flow control valve, the coolant is introduced into the battery through the first coolant passage and discharged from the battery through the second coolant passage.

17. The vehicle of claim 12, wherein when the flow direction of the coolant is controlled in the second direction by the coolant flow control valve, the coolant is introduced into the battery through the second coolant passage and discharged from the battery through the first coolant passage.

18. The vehicle of claim 12, wherein the controller is configured to change the operation mode of the coolant flow control valve in a state of reducing a speed of the water pump to a predetermined minimum speed.

19. The vehicle of claim 12, wherein the controller is configured to change the operation mode of the coolant flow control valve in a state of stopping a driving of the water pump.

20. The vehicle of claim 12, wherein the battery includes a plurality of battery modules in which the plurality of battery cells are grouped and configured and the plurality of battery modules are connected in series, in parallel, or in series and in parallel with respect to the flow direction of the coolant.

* * * * *